July 30, 1929. W. B. CAMPBELL Re. 17,387

ART OF MAKING LEATHER ARTICLES

Original Filed Oct. 19, 1926 3 Sheets-Sheet 1

INVENTOR.
Wendell B Campbell
BY
Allen & Allen
ATTORNEYS

July 30, 1929. W. B. CAMPBELL Re. 17,387

ART OF MAKING LEATHER ARTICLES

Original Filed Oct. 19, 1926 3 Sheets-Sheet 2

INVENTOR.
Wendell B Campbell

BY
Allen & Allen
ATTORNEYS

July 30, 1929. W. B. CAMPBELL Re. 17,387

ART OF MAKING LEATHER ARTICLES

Original Filed Oct. 19, 1926 3 Sheets-Sheet 3

INVENTOR.
Wendell B Campbell
BY
Allen & Allen
ATTORNEYS

Reissued July 30, 1929. Re. 17,387

UNITED STATES PATENT OFFICE.

WENDELL B. CAMPBELL, OF CINCINNATI, OHIO, ASSIGNOR TO THE PERKINS-CAMPBELL COMPANY, OF CINCINNATI, OHIO, A CORPORATION OF OHIO.

ART OF MAKING LEATHER ARTICLES.

Original No. 1,710,043, dated April 23, 1929, Serial No. 142,732, filed October 19, 1926. Application for reissue filed June 6, 1929. Serial No. 369,019.

My invention relates broadly to the art of making leather articles, and in the shoe industry particularly to the art of making fancy shoes which have elements such as the vamps, quarters, facings, foxings, heel covers and trimmings, which are composed in whole or in part of leather having different finishes or colors.

In the leather goods manufacturing art there is a constant demand for piecing together pieces of leather having different finishes. In the manufacture of leather bags, cases, belts, portfolios, suit cases, pocketbooks, clothing, upholstered goods, and shoes, the requirements of style demand that the articles be made of pieces of leather having different finishes and colors. This is particularly apparent in the shoe art. The provision of shoes having unique style effects has become of such importance in the industry that not only have the wearing qualities of the leather been regarded of less importance, but there has been a tremendous waste in scrap leather, which it is the object of my invention to minimize.

Every hide, or animal skin, which by nature is designed as a protective coating for an animal, has portions which are better suited for use in some parts of a shoe or leather article than in other parts. It is my object to teach the art of utilizing leather hides and substantial portions thereof in such a manner as to selectively adapt those parts of the leather for use in those parts of the manufactured article for which they are best suited, irrespective of the finish applied thereto, which has not been possible heretofore without the wastage of tremendous quantities of valuable leather, which have been subjected to unnecessary and expensive finishing treatments.

It is my object to disclose how the individual component parts of an article may be taken from that part of the skin for which the leather is best adapted. It is further my object to greatly facilitate the dyeing and coloring of those parts of the article which require coloring.

It is my object also to greatly facilitate the embossing of patterns on those portions requiring them, and to decrease very materially the expense of special treatment such as scotch graining in those parts of the articles which require this type of leather. In addition to showing how comparatively great savings may be made, it is further my object to teach an art which will greatly widen the range of decorative effects which may be obtained.

It is also the object of my art to greatly facilitate the producing of various finishing effects by cheaper equipment and much less ponderous and dangerous machinery than is now required.

In order to explain the advantage of cutting out the individual component parts for shoes from a side of leather so as to utilize the portion of the hide best suited for a particular purpose, I have illustrated the principle involved in connection with shoe manufacturing, and have shown how the component parts of a shoe having a pattern requiring component parts of differently finished leather, may be efficiently cut from an unfinished hide or substantial part thereof.

Referring to the drawings:—

Figure 1:
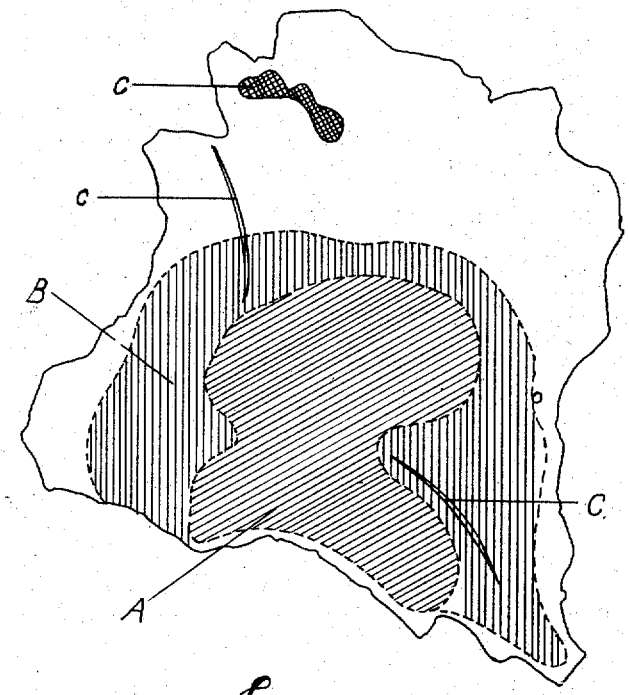
Figure 1 is a plan view of a side of leather showing in shaded areas the portions of the side which can be utilized for the various shoe elements.
Figure 2:
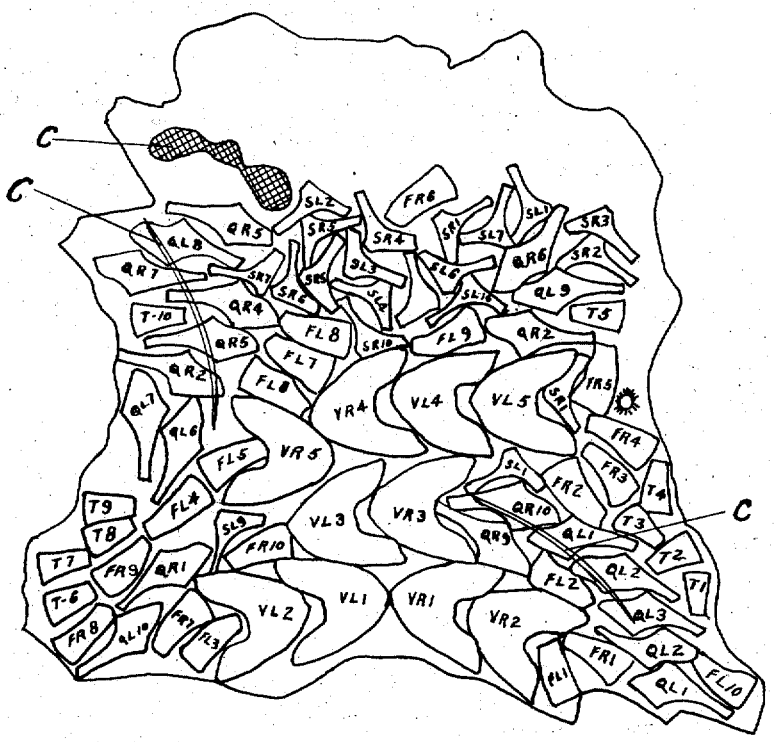
Figure 2 is a plan view showing how the side of leather shown in Figure 1 could be cut into shoe elements, such as would be required for assembling the shoe shown in Figure 3.

The side of leather illustrated in Figures 1 and 2 is a calf skin in which the area A shaded with diagonal lines is the thick unwrinkled portion called the butt of the side. This portion is available for shoe vamps. The nearer to the lower end of the side in which the vamps are cut will ordinarily determine the quality of the shoe in which the vamps are to be used. The portion B of the side shaded with vertical lines is the portion which can be used for shoe quarters and what is called the foxing. The remaining portion of the side is available for facing or saddle pieces and for tongues. The number of pairs of shoes which can be cut from the side depends primarily on the number of vamps which can be cut from it, as all the portions available for quarters and foxing, saddles and tongues could be cut from the portions available for vamps.

Figure 3:
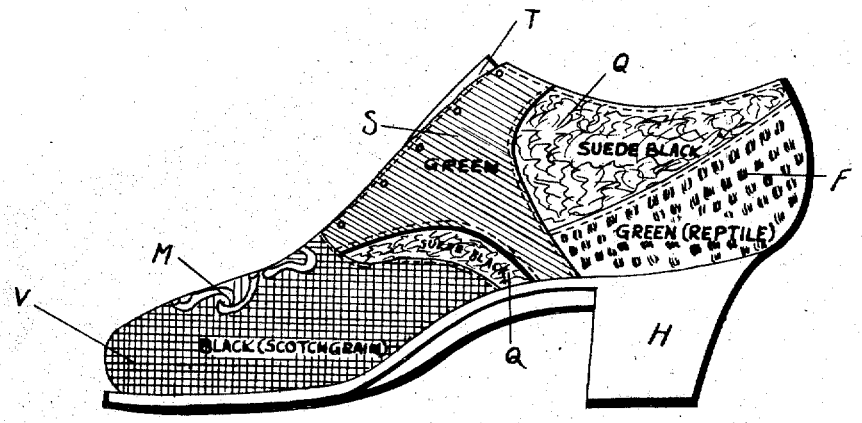
Figure 3 is a ladies' shoe of a pattern which has been selected for purposes of illustration.

Referring to the sample shoe which we have illustrated in Figure 3: The shoe is a ladies' shoe having a vamp V of scotch grained leather with a flower medallion M embossed in the center of the tip. The quarter Q of the shoe is of black suede formed by processing the flesh side of the leather. The saddle or facing S as it is called in the trade, is of plain green colored leather. The foxing F is of green colored leather having a reptilian design, as indicated, embossed on it. The tongues T are of plain black grained leather.

Figure 2 illustrates how a shoe cutter would proceed to cut up such a side of leather for manufacturing shoes according to the sample indicated. The pieces which are to make up component elements of the shoes are marked in sequence, V—L—1 indicating the vamp portion for the left shoe of the first pair of shoes. V—R—2 indicating the vamp portion for the right shoe of the first pair. It will be noted that the side indicated provides ten vamps marked in sequence up to V—L—10 and V—R—10, so that five pairs of shoes may be made.

The hide has some cuts and markings such as salt stains and wire fence scratches, which are indicated at C which it will be noted the cutter cuts almost entirely into suede pieces and scrap of such size as to be utilizable.

The foxing parts are indicated at F, the foxing for the first pair of shoes consisting of the parts F—L—1, F—L—2, F—R—1 and F—R—2. Each pair of shoes has a right shoe with a right and left foxing, and a left shoe with a right and left foxing, the right foxing for the right shoe being cut on the same pattern as the left.

The only scrap remaining from the side illustrated will be the neck portion which is of such comparatively large size as to be available for many purposes, both in the shoe manufacturing industry and in other industries, and under my process can be used for linings for the same shoes, and properly finished therefor after cutting.

Basically all leather made from one particular class and of one particular tannage is the same, regardless of the finish finally applied. All hides must first go through a process to remove the hair, and then through some tanning process. My new art contemplates the usual de-hairing process and a tanning operation. If I use vegetable tanned hides, the hides should be brought to the fully tanned condition, known as the crust condition in the trade. The hides must be then set, shaved stretched and dried. If chrome tanned hides are used, the hides should be given the usual pickling and chrome bath after de-hairing. At this stage in the present practice, the hides are fat liquored, stretched and dried, and must then be given the finishing treatment required at once, or else it will be impossible to preserve the proper receptive condition of the hides.

According to my process, a suitable treatment is given to the hides to permit of their being held, and subsequently given a finishing treatment. One way of doing this with chrome leathers is to employ a mixture of 2% of lactic acid with the chrome liquor. The hides may also be conditioned after the chrome bath by soaking in an aqueous bath containing 15% salts, 5% Glauber's salt, 2% glucose and 2% of glycerine. Alum tanned hides are given a similar treatment, with the substitution of an alum bath and treatment instead of a chrome bath.

When the hides have been so treated as to permit of reconditioning, which is usually done by wetting the hides, they may be given the fat liquor treatment, stretched and dried, or they may be left in their tanned condition, without fat liquoring, and this increasing of fatty content given to the hides before or after they are cut up into shoe parts, or two fat liquor treatments can be given, one before shipment, and the other later.

If other tanning treatments are used, the leather should be prepared in such condition that it may be subsequently finished, and as my art contemplates the finishing of the individual component parts after they have been cut to shape and size for shoes or the other articles in which they are to be used, any tanning treatment which leaves the leather in such a condition that it cannot be subsequently finished, and which would require an immediate cutting into shoe parts following the normal fat liquoring, or which would require the finishing with colors, embossing, graining, or the like, could not be effectively applied in accordance with my process.

It is contemplated that the manufacturer will receive his hides in such a condition that he can re-wet or recondition them, before cutting into various elements, to which the desired finish is subsequently applied.

According to my invention I apply the finish to the pieces after they are cut from the hide, thus obtaining the correct finish for the desired type of leather with a minimum of waste.

I desire to cover in my process any mode of preparing leather which will permit of its being held sufficiently before finishing to permit of shipment, storage and cutting up into various types of parts for leather articles, and have recited but one method as applied to chrome and alum leathers in relation to shoe manufacture, which is typical of the treatment which should be applied to other types of tanned leathers.

The methods of tanning heretofore employed would result in leaving the hide in such a condition that it could not be given a subsequent finishing treatment because of its having so "set" in its condition that further treatment is impossible.

In accordance with my invention, the hide in a condition which will permit of its being given whatever finish is desired, is cut up into the component parts of the article to be made while in this condition. In my drawing and explanation thereof, I have fully indicated in a typical piece of leather, the factors which will control in the cutting. After the cutting, the individual pieces of leather are given the desired finishing, in which finishing a wide variety of treatments may be given, as brushing with color, dipping into color, japanning and baking, embossing, sanding, graining, etc.

The art of making leather articles by preparing a hide to receive a surface finish, then cutting out the component parts of the article and then giving the individual pieces a surface finish, is primarily advantageous because it eliminates the finishing of much leather which will not be available for use even after it is finished. Then it brings the leather pieces forming the component parts of the article, down to such a size and shape that they can be given the treatments such as sanding, coloring and embossing much more economically than was heretofore possible. It also avoids the difficulty in matching colors or embossed patterns in articles requiring matched patterns. Finally it enables the cutting of the hide or skin with a much wider range of possibilities of using the particular part of the hide in that part of the article for which it is best adapted.

The embossing of previously cut leather pieces, such, for example, as is required for the vamps of shoes, and the embossing, for example, with reptile marking, only requires a small embossing and plating roller or plate sufficiently large to handle a single element, instead of a cumbersome, expensive and dangerous mechanism. The disposition of the markings in desired portions of the leather pieces may further be accurately controlled. If, as has been standard practice in the past, an entire hide were to be embossed with a flowered design as is shown on the shoe tip in Figure 3, it would be almost impossible to so cut the vamps that the right quality of leather would be available and at the same time the flowered design would occur in the center of the tip. In entire sides of leather which are embossed with reptilian designs, the cutting and matching of the pieces for each shoe is a task that is most arduous, and as a result, efficiency in cutting is impossible.

In applying a color coating to small pieces of leather, such as are required for the component parts of an article, colors which, because of their quick drying qualities, cannot be used on entire sides, may be employed. I prefer to use strong pigment coatings, which may be applied with one stroke across the piece, with a swab or brush. This enables me to make a very uniform shade of color which avoids all difficulty of matching colors in parts for the same article. It has been almost impossible in the past to obtain a uniform color on an entire hide or substantial portion thereof, without repeated thin coatings very carefully applied.

There are a number of pigments and other finishing processes which can only be used in coating a small piece with one application, which I am able to use, so that a very wide range of shades and intensities may be achieved.

In patent leather shoes, for example, very particular selection of the leather composing it, is required, and my art contemplates the selection of the parts prior to the application of the patent leather finish. After cutting out the elements, I japan them and then bake them in a japanning oven, where being in such small units, accurate control of the heat is much more readily accomplished and better work can be done.

In considering the advantages of selecting the leather for the parts of various leather articles prior to the finishing operation, it should be noted that I have taught an art which is economically of great importance. Although the market price of leather is constantly fluctuating, if we assume a certain price per pound at the tannery of unfinished leather, when a finishing treatment such as dyeing and coloring, embossing with a reptile pattern, or scotch graining has been accomplished, the cost of the leather has increased many times.

For example, in the particular shoe which I have illustrated, the cost of the untreated leather would be only about one third of the cost if the various finishing treatments had been applied. This is because for coloring an entire or substantial portion of a hide from six to twelve coatings of thin pigment have to be applied, and a strong pigment such as I employ for coloring with a single coat cannot be applied to an entire side of the leather. If a side of leather is to be embossed with a reptile design, there is required a very expensive embossing die. If the hide is to be scotch grained for shoe manufacture, the expense, which I minimize because I treat only those parts which are to be scotch grained in the finished shoe, is wasted if the entire hide is scotch grained, because the only part of the leather which could be utilized would be the vamp portion, in the shoe which I have illustrated.

Actual calculations which I have had verified again and again by different shoe manufacturers, show that in the making of fancy shoes, often there is a cutting scrap of as high as sixty per cent. Leathers which are bought because certain types of shoes require certain types of elements therein accumulate until inventories of leather are carried which represent huge investments which are reflected in the high price of shoes. My art avoids the expensive treatment of much leather which cannot be used after treatment.

The economies of finishing the individual elements of articles in accordance with the requirements of the article, make the possibilities of applying a wide variety of finishes much more economically than was heretofore possible. In dyeing and subsequently coloring an entire hide or a substantial part thereof even though six to twelve coats of weak pigment have been applied, when the elements of the article are cut from the side subsequently, it is almost impossible to match the colors without great loss in scrap. In applying one coating of a strong color, all matching difficulty is avoided, and there is a much wider range of coloring possibility than where weak colors are used.

In embossing entire hides or substantial parts thereof, the problem of arranging the embossed elements so that they will appear in certain positions in the manufactured articles is also a source of great waste, and results in the use of much leather not suitable for a particular element in which it is used.

In cutting the elements for a shoe prior to the finishing of the leather, I am able to split the hide and prepare the outer side with one finish and the inner side with another finish, which again makes a material saving in the leather required. This is particularly advantageous in shoe and belt manufacture, and in the manufacture of traveling bags and cases.

Having thus described my invention, what I claim as new and desire to secure by Letters Patent, is:—

1. Those steps in the process of manufacturing shoes which consist in tanning and preparing a hide to receive a surface finish, then cutting out from the hide dissimilar parts for shoe uppers, using those parts of the hide for the particular shoe parts for which the quality of the particular part of the hide cut out is best adapted, then independently finishing each part with its desired finish after the parts are cut before finally making the parts into the uppers of shoes.

2. Those steps in the process of manufacturing shoes which consist in tanning and preparing a hide to properly receive a leather dye, then cutting out from the hide parts for shoe uppers, using those parts of the hide for the particular shoe parts for which the parts of the hide cut out are best adapted, then independently dyeing each part a desired color after the parts are cut and surface finishing the dyed parts prior to their assembly into shoes.

3. Those steps in the process of manufacturing shoes which consist in tanning and preparing a hide to properly receive a surface finish, including such steps as will permit the hide to be reconditioned by wetting, subsequently wetting and reconditioning the hide, then cutting out from the hide parts for shoe uppers using those parts of the hide for the particular shoe parts for which the parts cut out from the hide are best adapted, then independently surface finishing each part with its desired finish after the parts are cut before finally making the parts into shoe uppers.

4. These steps in the process of making shoes which consist in tanning and preparing a hide to properly receive a surface finish, then cutting out from the hide parts for shoe uppers, using those parts of the hide for the particular shoe parts for which the quality of the particular part of the hide cut out is best adapted, then independently fat liquoring and finishing each part with its desired finish prior to the assembly of the parts in a shoe.

5. Those steps in the process of making shoes which consist in tanning and preparing a hide to receive a color coating, then cutting from the hide parts for shoe uppers using those parts of the hide for the particular shoe parts for which the parts of the hide cut out are best adapted, and then independently surface coating each part with a single application of color prior to the assembly of the parts in a shoe.

6. Those steps in the process of making shoes which consist in tanning and preparing a hide to receive a surface finish, then cutting out from the hide parts for shoe uppers using those parts of the hide for the particular shoe parts for which the parts cut out are best adapted, and then coloring and independently scotch graining those parts which are to have a scotch grain in the finished shoe prior to the assembly of the shoe.

7. Those steps in the process of making shoes which consist in tanning and preparing a hide to receive a surface finish, then splitting the hide, then cutting out from one split portion parts for shoe uppers using those parts of the hide for the particular shoe parts for which the parts of the hide cut out are best adapted, then cutting out from the other split portion other parts for shoes, then independently finishing each part with its desired finish prior to the assembly of the parts in a shoe.

8. Those steps in the process of manufacturing a leather article, which consist in tanning and preparing a hide to receive a surface finish, then cutting out from the hide dissimilar parts for the article, using those parts of the hide for the particular parts of the article for which the quality of the particular part of the hide cut out is best adapted, then independently finishing each part with its desired finish after the parts are cut, before finally making the parts into the finished leather article.

9. Those steps in the process of manufacturing a leather article, which consist in tanning and preparing a hide to properly receive a surface finish, including such steps as will permit the hide to be reconditioned, subsequently reconditioning the hide, then cutting out from the hide parts for the article, using those parts of the hide for the particular parts of the article for which the parts cut out from the hide are best adapted, then independently surface finishing each part with its desired finish after the parts are cut, before finally making the parts into the finished article.

10. Those steps in the process of making leather articles which consist in tanning and preparing a hide to receive a surface finish, then splitting the hide, then cutting out from one split portion parts for the article using those parts of the hide for the particular parts of the article for which the parts of the hide cut out are best adapted, then cutting out from the other split portion other parts for the article, and then independently finishing each part with its desired finish prior to the assembly of the parts in the finished article.

WENDELL B. CAMPBELL.